United States Patent
He et al.

(10) Patent No.: US 10,476,889 B2
(45) Date of Patent: Nov. 12, 2019

(54) INFORMATION INTERACTION METHOD, APPARATUS AND SYSTEM

(71) Applicant: TENCENT TECHNOLOGY (SHENZHEN) COMPANY LIMITED, Shenzhen (CN)

(72) Inventors: Xiao He, Shenzhen (CN); Jiwei Guo, Shenzhen (CN); Huankui Chen, Shenzhen (CN); Jing Ning, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 233 days.

(21) Appl. No.: 15/188,576

(22) Filed: Jun. 21, 2016

(65) Prior Publication Data

US 2016/0352757 A1    Dec. 1, 2016

Related U.S. Application Data

(63) Continuation of application No. PCT/CN2014/095325, filed on Dec. 29, 2014.

(30) Foreign Application Priority Data

Dec. 30, 2013   (CN) .......................... 2013 1 0746722

(51) Int. Cl.
    *H04L 29/06*      (2006.01)
    *G06F 21/41*      (2013.01)
                (Continued)

(52) U.S. Cl.
    CPC ............ *H04L 63/126* (2013.01); *G06F 21/41* (2013.01); *G06Q 20/401* (2013.01);
                (Continued)

(58) Field of Classification Search
    CPC .................................................. H04L 63/126
    See application file for complete search history.

(56) References Cited

U.S. PATENT DOCUMENTS

2007/0130062 A1    6/2007   Huh
2008/0032736 A1*   2/2008   Bari ...................... H04W 12/06
                                               455/552.1
(Continued)

FOREIGN PATENT DOCUMENTS

CN         1902657 A     1/2007
CN         1968103 A     5/2007
(Continued)

OTHER PUBLICATIONS

International Search Report dated Mar. 27, 2015 for International App. No. PCT/CN2014/095325 filed Dec. 29, 2014 (13 pages).
(Continued)

*Primary Examiner* — Simon P Kanaan
(74) *Attorney, Agent, or Firm* — Brinks Gilson & Lione

(57) ABSTRACT

An information interaction method, apparatus and system are provided. A sensitive operation pre-performing message is received from a terminal where a secondary account is located. The sensitive operation pre-performing message may carry a secondary account identifier. Based on the secondary account identifier and a pre-stored association relationship between a primary account identifier and the secondary account identifier, the primary account identifier corresponding to the secondary account identifier may be determined. Based on the determined primary account identifier, a sensitive operation verification request message may be sent to a terminal where the primary account is located. A verification result information may be received from the terminal where the primary account is located. Based on the verification result information, sensitive operation instruction information may be sent to the terminal where the secondary account is located to instruct the terminal where the secondary account is located to perform or cancel the sensitive operation.

17 Claims, 8 Drawing Sheets

(51) Int. Cl.
  *G06Q 20/40* (2012.01)
  *H04W 12/00* (2009.01)
  *H04W 12/08* (2009.01)

(52) U.S. Cl.
  CPC .......... *H04L 63/101* (2013.01); *H04L 63/102* (2013.01); *H04W 12/0027* (2019.01); *G06F 2221/2117* (2013.01); *H04L 63/08* (2013.01); *H04W 12/08* (2013.01)

(56) References Cited

U.S. PATENT DOCUMENTS

| | | | | |
|---|---|---|---|---|
| 2012/0047560 A1* | 2/2012 | Underwood | ........... | G06Q 10/06 726/4 |
| 2012/0259768 A1 | 10/2012 | Mukherjee | | |
| 2015/0032578 A1* | 1/2015 | Bicer | ...................... | H04L 63/08 705/26.82 |
| 2015/0106220 A1* | 4/2015 | Zhang | ................... | G06Q 30/06 705/26.1 |
| 2015/0312265 A1* | 10/2015 | Hu | ......................... | H04L 63/08 726/7 |

FOREIGN PATENT DOCUMENTS

| | | | |
|---|---|---|---|
| CN | 101493912 | A | 7/2009 |
| CN | 102769602 | A | 11/2012 |
| CN | 103166910 | A | 6/2013 |

OTHER PUBLICATIONS

International Written Opinion dated Mar. 27, 2015 for International App. No. PCT/CN2014/095325 filed Dec. 29, 2014 (4 pages).

\* cited by examiner

INFORMATION INTERACTION METHOD, APPARATUS AND SYSTEM

CROSS-REFERENCE TO RELATED APPLICATIONS

This application is a continuation application of International Application PCT/CN2014/095325, titled "INFORMATION INTERACTION METHOD, APPARATUS AND SYSTEM", and filed on Dec. 29, 2014, which claims priority to Chinese Patent Application No. 201310746722.7 titled "INFORMATION INTERACTION METHOD, DEVICE AND SYSTEM" and filed with the Chinese State Intellectual Property Office on Dec. 30, 2013, both of which are incorporated herein by reference in their entirety.

FIELD

The present disclosure relates to the field of internet technology, and in particular to an information interaction method, an apparatus and a system.

BACKGROUND

Accounts of a network seller generally include one primary account and multiple secondary accounts. The primary account is responsible for sensitive operations such as managing pages of an online store, managing secondary accounts, changing payment, refunding and transferring. And the secondary accounts are used to talk to buyers on issues such as commodity consultations and after-sale services.

In conventional technology, sensitive operations such as changing payment, refunding and transferring are all performed with the primary account. Many operations can not be processed in a timely manner for too many operations are required to be performed with the primary account.

SUMMARY

An information interaction method, an information interaction apparatus and an information interaction system are provided according to the present disclosure, so that a sensitive operation can be performed with a secondary account under the supervision of a primary account and thereby some sensitive operations can be processed in a timely manner.

In a first aspect of the present disclosure, an information interaction method applied to a server is provided, which includes:

receiving a pre-performing message of a sensitive operation from a terminal in which a secondary account is located, where an identifier of the secondary account is carried in the pre-performing message of the sensitive operation;

determining an identifier of a primary account corresponding to the identifier of the secondary account based on the identifier of the secondary account and a pre-stored association relationship between the identifier of the primary account and the identifier of the secondary account;

sending a verification request message of the sensitive operation to a terminal in which the primary account is located based on the determined identifier of the primary account;

receiving verification result information from the terminal in which the primary account is located; and sending instruction information of the sensitive operation to the terminal in which the secondary account is located based on the verification result information, to instruct the terminal in which the secondary account is located to perform or cancel the sensitive operation.

In a second aspect of the present disclosure, an information interaction apparatus applied to a server is provided, which includes:

a receiving unit, configured to receive a pre-performing message of a sensitive operation from a terminal in which a secondary account is located, where an identifier of the secondary account is carried in the pre-performing message of the sensitive operation;

a determining unit, configured to determine an identifier of a primary account corresponding to the identifier of the secondary account based on the identifier of the secondary account received by the receiving unit and a pre-stored association relationship between the identifier of the primary account and the identifier of the secondary account; and a sending unit, configured to send a verification request message of the sensitive operation to a terminal in which the primary account is located based on the identifier of the primary account determined by the determining unit, where the receiving unit is further configured to receive verification result information from the terminal in which the primary account is located, and the sending unit is further configured to send instruction information of the sensitive operation to the terminal in which the secondary account is located based on the verification result information received by the receiving unit, to instruct the terminal in which the secondary account is located to perform or cancel the sensitive operation.

In a third aspect of the present disclosure, an information interaction system is provided, which includes a terminal in which a secondary account is located, a terminal in which a primary account is located and a server.

The terminal in which the secondary account is located is configured to send a pre-performing message of a sensitive operation to the server, where an identifier of the secondary account is carried in the pre-performing message of the sensitive operation;

the server is configured to determine an identifier of the primary account corresponding to the identifier of the secondary account based on the identifier of the secondary account and a pre-stored association relationship between the identifier of the primary account and the identifier of the secondary account, and send a verification request message of the sensitive operation to the terminal in which the primary account is located based on the determined identifier of the primary account;

the terminal in which the primary account is located is configured to receive the verification request message of the sensitive operation from the server, generate verification result information based on the verification request message, and send the verification result information to the server;

the server is further configured to send instruction information of the sensitive operation to the terminal in which the secondary account is located based on the verification result information from the terminal in which the primary account is located; and the terminal in which the secondary account is located is further configured to perform or cancel the sensitive operation according to the instruction information of the sensitive operation.

In the present disclosure, the pre-performing message of the sensitive operation from the terminal in which the secondary account is located is received, where the identifier of the secondary account is carried in the pre-performing message of the sensitive operation; the identifier of the primary account corresponding to the identifier of the secondary account is determined based on the identifier of the secondary account and the pre-stored association relationships between identifiers of primary accounts and identifiers of secondary accounts; the verification request message of the sensitive operation is sent to the terminal in which the primary account is located based on the determined identifier of the primary account; the verification result information from the terminal in which the primary account is located is received; and the instruction information of the sensitive operation is sent to the terminal in which the secondary account is located based on the verification result information, to instruct the terminal in which the secondary account is located to perform or cancel the sensitive operation. In contrast with conventional technology that sensitive operations are all required to be performed with a primary account, a sensitive operation can be performed with a secondary account under the supervision of the primary account in the method according to the present disclosure, so that some sensitive operations can be processed in a timely manner and security of operations can be improved.

BRIEF DESCRIPTION OF THE DRAWINGS

The drawings to be used in the descriptions of the embodiments are described briefly as follows, so that technical solutions according to the embodiments of the present disclosure may become clearer. Apparently, the drawings in the following descriptions only illustrate some embodiments of the invention. For those in the art, other drawings may be obtained based on these drawings without any creative work.

DETAILED DESCRIPTION

An information interaction method is provided according to the embodiments of the present disclosure. Sensitive operations can be performed with a secondary account under the supervision of a primary account and thereby some sensitive operations can be processed in a timely manner and accordingly, an apparatus and a system are further provided according to the embodiments of the present disclosure, which are described as follows.

Technical solutions according to the embodiments of the present disclosure are described clearly and completely hereinafter in conjunction with the drawings in the embodiments of the present disclosure. Apparently, the described embodiments are only a few rather than all of the embodiments of the invention. Any other embodiments obtained by those skilled in the art based on the embodiments according to the present disclosure without any creative work fall in the scope of the invention.

Figure 1:
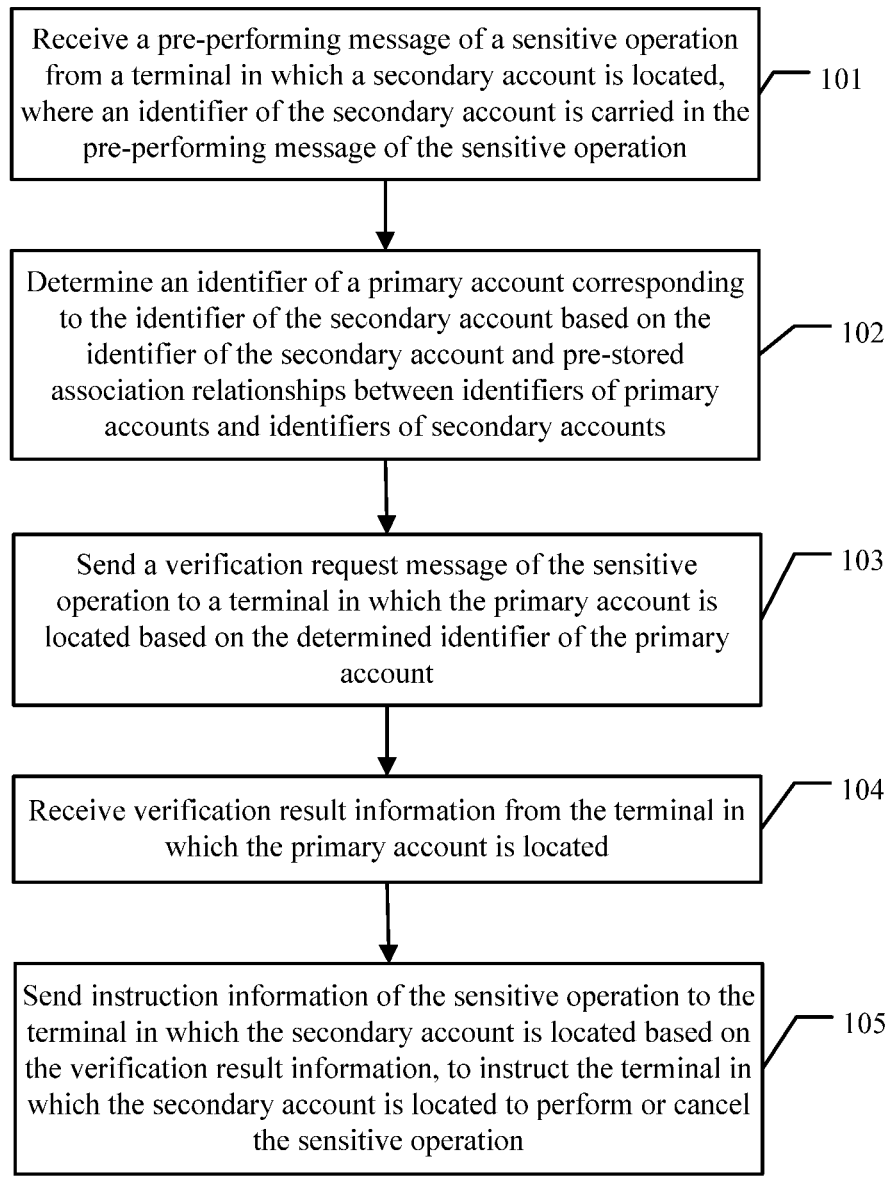
FIG. 1 is a flow chart including steps of an information interaction method according to an embodiment of the invention.

Reference is made to FIG. 1, which shows an information interaction method according to an embodiment of the invention. In the embodiment, the information interaction method is applied to a server and includes steps 101 to 105.

At 101, a pre-performing message of a sensitive operation is received from a terminal in which a secondary account is located, where an identifier of the secondary account is carried in the pre-performing message of the sensitive operation.

In the embodiment of the invention, the identifier of the secondary account is used to identify the secondary account. A sensitive operation is an operation initiated with the secondary account and requiring confirmation with a primary account. For example, the sensitive operation may be an operation which may affect interests of a store owner, such as changing payment, refunding or transferring.

When a clerk performs the sensitive operation through the terminal in which the secondary account is located, the sensitive operation will not be performed immediately. Instead, the terminal in which the secondary account is located sends the pre-performing message of the sensitive operation to the server and determines whether the sensitive operation is allowed to be performed with the secondary account based on verification result information returned by the server.

At 102, an identifier of a primary account corresponding to the identifier of the secondary account is determined based on the identifier of the secondary account and pre-stored association relationships between identifiers of primary accounts and identifiers of secondary accounts.

In the embodiment of the invention, an identifier of a primary account is used to identify a primary account.

Association relationships between identifiers of all primary accounts and identifiers of all secondary accounts are pre-stored in the server, as is shown in Table 1, for example.

TABLE 1

| association relationships between identifiers of primary accounts and identifiers of secondary accounts | |
|---|---|
| Primary accounts | Secondary accounts |
| 80764321 | 80761111 |
|  | 80762222 |
|  | 80763333 |
|  | 80764444 |
| 57214635 | 57214444 |
|  | 57216666 |
|  | 57213333 |
|  | 57215555 |
|  | 57210000 |

According to Table 1, an identifier of a primary account 80764321 is associated with four identifiers of secondary accounts, and an identifier of a primary account 57214635 is associated with five identifiers of secondary accounts.

At 103, a verification request message of the sensitive operation is sent to a terminal in which the primary account is located based on the determined identifier of the primary account.

At 104, verification result information is received from the terminal in which the primary account is located.

For example, when a transferring operation is required to be performed with a secondary account with an identifier 80761111, a terminal in which the secondary account with the identifier 80761111 is located sends a transferring pre-performing message to the server. The server then determines that an identifier of a primary account associated therewith is 80764321 by querying with the identifier 80761111 of the secondary account, and sends a verification request message of the sensitive operation to a terminal in which the primary account with the identifier 80764321 is located. The terminal in which the primary account is located is generally a cellphone of the store owner, and the store owner can supervise the sensitive operation performed by the clerk with the secondary account at all times. After the store owner agrees to perform the transferring operation with the secondary account with the identifier 80761111, verification result information indicating approval is sent to the server.

At 105, instruction information of the sensitive operation is sent to the terminal in which the secondary account is located based on the verification result information, to instruct the terminal in which the secondary account is located to perform or cancel the sensitive operation.

After receiving the verification result information indicating approval from the terminal in which the primary account is located, the server sends instruction information indicating approval of the sensitive operation to the terminal in which the secondary account is located, so that the terminal in which the secondary account is located can perform the transferring operation.

In the embodiment of the invention, the pre-performing message of the sensitive operation from the terminal in which the secondary account is located is received, where the identifier of the secondary account is carried in the pre-performing message of the sensitive operation. The identifier of the primary account corresponding to the identifier of the secondary account is determined based on the identifier of the secondary account and the pre-stored association relationships between identifiers of primary accounts and identifiers of secondary accounts. The verification request message of the sensitive operation is sent to the terminal in which the primary account is located. The verification result information from the terminal in which the primary account is located is received. The instruction information of the sensitive operation is sent to the terminal in which the secondary account is located based on the verification result information, to instruct the terminal in which the secondary account is located to perform or cancel the sensitive operation. In contrast with that, sensitive operations are all required to be performed with a primary account in conventional technology, a sensitive operation can be performed with a secondary account under the supervision of the primary account in the method according to the embodiment of the invention, so that some sensitive operations can be processed in a timely manner and security of operations can be improved.

In an embodiment of the invention based on the embodiment corresponding to FIG. 1, before sending a verification request message of the sensitive operation to a terminal in which the primary account is located, the information interaction method may further include:

receiving an authentication application message from the terminal in which the primary account is located, where the identifier of the primary account is carried in the authentication application message;

authenticating the identifier of the primary account; and establishing and storing a correspondence relationship between the identifier of the primary account and the terminal in which the primary account is located after the identifier of the primary account is authenticated.

In the embodiment of the invention, before determining which terminal in which the primary account is located to verify the sensitive operation of the terminal in which the secondary account is located, the terminal in which the primary account is located may send the authentication application message to the server. After receiving the authentication application message, the server can send a verification code or a password by a short message to the terminal in which the primary account is located. After a user inputs the verification code or the password through the terminal in which the primary account is located, the server may determine that the authentication application of the terminal in which the primary account is located is approved, and associatively stores the identifier of the primary account and an identifier of the terminal in which the primary account is located in the server.

In an embodiment of the invention based on the embodiment corresponding to FIG. 1, after determining a primary account corresponding to the secondary account, the information interaction method may further include:

querying for the terminal in which the primary account is located based on the identifier of the primary account.

In an embodiment of the invention, the pre-performing message of the sensitive operation further includes information on the sensitive operation to be performed with the secondary account, and step 103 further includes:

sending the verification request message of the sensitive operation carrying the information on the sensitive operation to be performed with the secondary account to the terminal in which the primary account is located. Thereby, the terminal in which the primary account is located can determine the verification result information based on the information on the sensitive operation to be performed with the secondary account.

The sensitive operation in the embodiment of the invention is an operation initiated with the secondary account and requiring confirmation with the primary account. For example, the sensitive operation may be an operation which may affect interests of a store owner, such as changing payment, refunding or transferring.

When a clerk performs the sensitive operation through the terminal in which the secondary account is located, the sensitive operation will not be performed immediately. Instead, the terminal in which the secondary account is located sends the pre-performing message of the sensitive operation to the server. The pre-performing message of the sensitive operation may include the information on the sensitive operation to be performed with the secondary account. Thereby, the server sends the verification request message of the sensitive operation carrying the information on the sensitive operation to be performed with the secondary account to the terminal in which the primary account is located. The terminal in which the primary account is located receives the information on the sensitive operation to be performed in the verification request message of the sensitive operation and displays the information on a display screen. For example, whether to agree to perform the sensitive operation can be displayed on the display screen of the terminal in which the primary account is located. A user can choose whether to agree to perform the sensitive operation, so that the verification result information can be generated based on a choice of the user.

In the embodiment of the invention, after determining the identifier of the primary account based on the identifier of the secondary account, the server finds the terminal in which the primary account is located from the stored correspondence relationships between identifiers of primary accounts and terminals in which the primary accounts are located, based on the identifier of the primary account, and sends the verification request message of the sensitive operation to the terminal in which the primary account is located.

Figure 2:
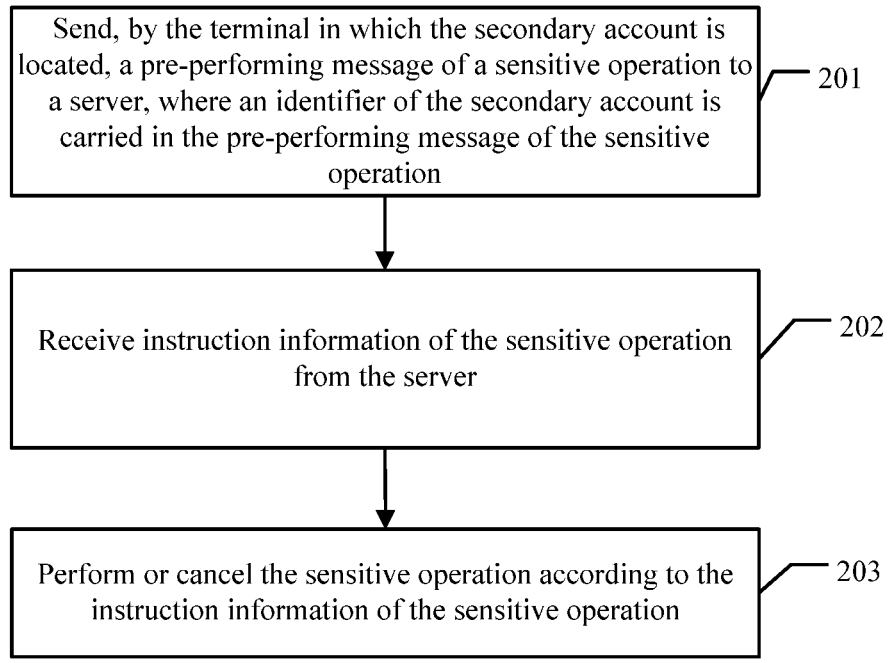
FIG. 2 is a flow chart including steps of an information interaction method according to an embodiment of the invention.

Reference is made to FIG. 2, which shows an information interaction method according another embodiment of the invention. In the embodiment, the information interaction method is applied to a terminal in which a secondary account is located and includes step 201 to 203.

At 201, the terminal in which the secondary account is located sends a pre-performing message of a sensitive operation to a server, where an identifier of the secondary account is carried in the pre-performing message of the sensitive operation.

In the embodiment of the invention, the identifier of the secondary account is used to identify the secondary account. A sensitive operation is an operation initiated with the secondary account and requiring confirmation with a primary account. For example, the sensitive operation may be an operation which may affect interests of a store owner, such as changing payment, refunding or transferring.

When a clerk performs the sensitive operation through the terminal in which the secondary account is located, the sensitive operation will not be performed immediately. Instead, the terminal in which the secondary account is located sends the pre-performing message of the sensitive operation to the server and determines whether the sensitive operation is allowed to be performed with the secondary account based on verification result information returned by the server.

At 202, instruction information of the sensitive operation is received from the server.

At 203, the sensitive operation is performed or cancelled according to the instruction information of the sensitive operation.

In a case where the clerk performs a transferring operation through the terminal in which the secondary account is located and the store owner approves the transferring operation, the server sends an instruction indicating approval of the sensitive operation to the terminal in which the secondary account is located and the terminal in which the secondary account is located performs the transferring operation. In a case where the store owner does not approve the transferring operation, the server sends an instruction indicating denial of the sensitive operation to the terminal in which the secondary account is located and the terminal in which the secondary account is located cancels the transferring operation.

In the embodiment of the invention, the terminal in which the secondary account is located sends the pre-performing message of the sensitive operation to the server, where the identifier of the secondary account is carried in the pre-performing message of the sensitive operation and the identifier of the secondary account is used to identify the secondary account. The terminal in which the secondary account is located receives the instruction information of the sensitive operation from the server and performs or cancels the sensitive operation according to the instruction information of the sensitive operation. In contrast with conventional technology where sensitive operations are all required to be performed with a primary account, a sensitive operation can be performed with a secondary account under the supervision of the primary account in the method according to the embodiment of the invention, so that some sensitive operations can be processed in a timely manner and security of operations can be improved.

In an embodiment of the invention based on the embodiment corresponding to FIG. 2, before sending, by the terminal in which the secondary account is located, a pre-performing message of the sensitive operation to a server, the information interaction method may further include:

receiving an instruction for the sensitive operation inputted by a user; and generating the pre-performing message of the sensitive operation based on the instruction for the sensitive operation.

In the embodiment of the invention, a clerk inputs the instruction for the sensitive operation through the terminal in which the secondary account is located, and the terminal in which the secondary account is located generates the pre-performing message of the sensitive operation and sends the pre-performing message of the sensitive operation to the server.

Figure 3:
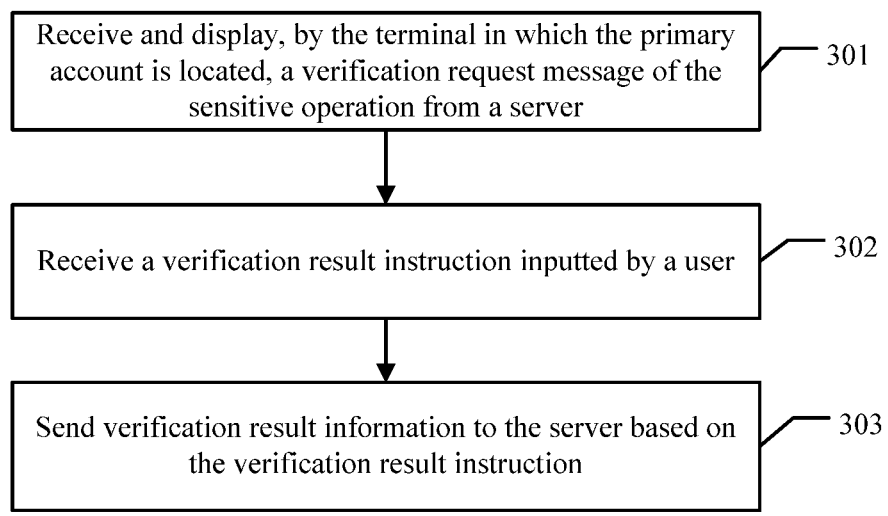
FIG. 3 is a flow chart including steps of an information interaction method according to an embodiment of the invention.

Reference is made to FIG. 3, which shows an information interaction method according to another embodiment of the invention. In the embodiment of the invention, the information interaction method is applied to a terminal in which a primary account is located and includes steps 301 to 303.

At 301, the terminal in which the primary account is located receives and displays a verification request message of the sensitive operation from a server.

The verification request message of the sensitive operation may include information on a sensitive operation to be performed with a secondary account. The terminal in which the primary account is located can determine verification result information based on the information on the sensitive operation to be performed with the secondary account.

The terminal in which the primary account is located is generally a cellphone. The verification request message of the sensitive operation may be whether to agree to perform a transferring operation or whether to agree to perform a price changing operation, and whether to agree to perform a corresponding sensitive operation can be displayed on a display interface of the terminal.

At 302, a verification result instruction inputted by a user is received.

In a case that a store owner agrees, the store owner can tap an "Agree" or "Yes" button on the display interface, and in a case that the store owner does not agree, the store owner can tap a "Do not agree" or "No" button on the display interface.

At 303, verification result information is sent to the server based on the verification result instruction.

The terminal in which the primary account is located sends verification result information to the server based on the verification result instruction inputted by the store owner.

The verification result information may be information indicating approval of the sensitive operation or information indicating denial of the sensitive operation.

In the embodiment of the invention, the terminal in which the primary account receives and displays the verification request message of the sensitive operation from the server, receives the verification result instruction inputted by the user and sends the verification result information to the server based on the verification result instruction. In contrast with conventional technology that sensitive operations are all required to be performed with a primary account, a sensitive operation can be performed with a secondary account under the supervision of the primary account in the method according to the embodiment of the invention, so that some sensitive operations can be processed in a timely manner and security of operations can be improved.

Optionally, in an embodiment based on the embodiment corresponding to FIG. 3, before receiving and displaying a verification request message of the sensitive operation from a server, the information interaction method may further include:

sending an authentication application message to the server, where an identifier of the primary account is carried in the authentication application message. Thereby, the server authenticates the identifier of the primary account, and establishes and stores a correspondence relationship between the identifier of the primary account and the terminal in which the primary account is located after the identifier of the primary account is authenticated.

In the embodiment of the invention, before determining which terminal in which the primary account is located to verify the sensitive operation of the terminal in which the secondary account is located, the terminal in which the primary account is located needs to send the authentication application message to the server. After receiving the authentication application message, the server can send a verification code or a password by a short message to the terminal in which the primary account is located. After the user inputs the verification code or the password through the terminal in which the primary account is located, the server determines that an authentication application of the terminal in which the primary account is located is approved, and associatively stores the identifier of the primary account and an identifier of terminal in which the primary account is located in the server.

Figure 4:
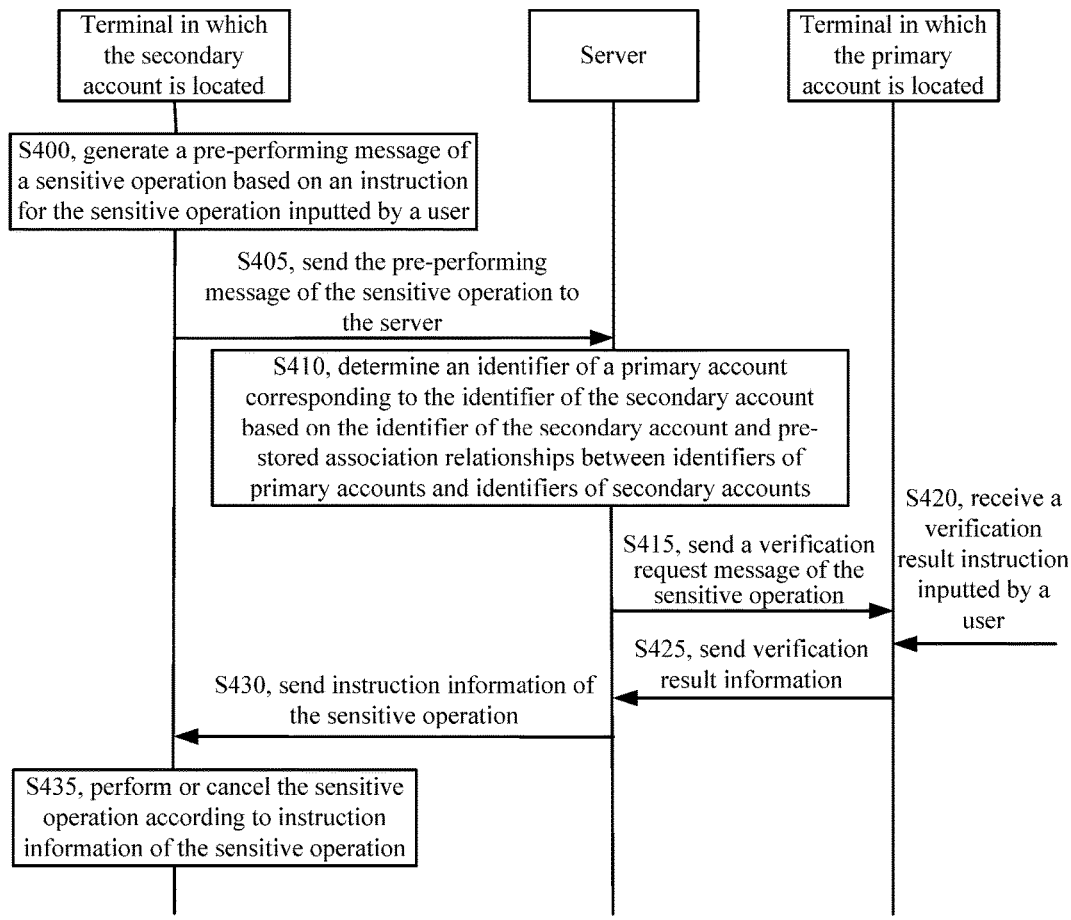
FIG. 4 is a flow chart including steps of an information interaction method according to an embodiment of the invention.

For ease of understanding, reference can be made to FIG. 4, which shows an information interaction process according to an embodiment of the invention in an application scenario, for example, which includes steps S400 to S435.

In S400, a terminal in which a secondary account is located generates a pre-performing message of a sensitive operation based on an instruction for the sensitive operation inputted by a user.

In S405, the terminal in which the secondary account is located sends the pre-performing message of the sensitive operation to a server. An identifier of the secondary account is carried in the pre-performing message of the sensitive operation and the identifier of the secondary account is used to identify the secondary account.

In S410, the server determines an identifier of a primary account corresponding to the secondary account based on the secondary account and pre-stored association relationships between identifiers of primary accounts and identifiers of secondary accounts.

The identifier of the primary account is used to identify the primary account. After determining the identifier of the primary account, the server may further query for a terminal in which the primary account is located based on the identifier of the primary account.

In S415, the server sends a verification request message of the sensitive operation to the terminal in which the primary account is located.

In S420, the terminal in which the primary account is located receives a verification result instruction inputted by a user.

In S425, the terminal in which the primary account is located sends verification result information to the server.

In S430, the server sends instruction information of the sensitive operation to the terminal in which the secondary account is located based on the verification result information from the terminal in which the primary account is located.

In S435, the terminal in which the secondary account is located performs or cancels the sensitive operation according to the instruction information of the sensitive operation.

In contrast with conventional technology that sensitive operations are all required to be performed with a primary account, a sensitive operation can be performed with a secondary account under the supervision of the primary account in the method according to the embodiment of the invention, so that some sensitive operations can be processed in a timely manner and security of operations can be improved.

Figure 5:
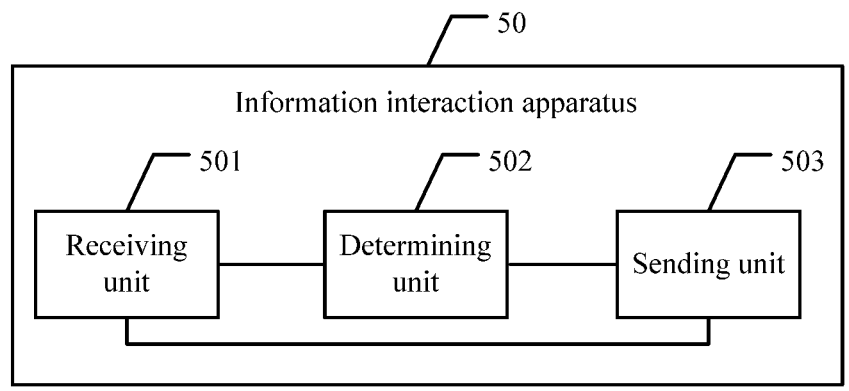
FIG. 5 is a schematic diagram of an information interaction apparatus according to an embodiment of the invention.

Reference is made to FIG. 5, which shows an information interaction apparatus 50 according to an embodiment of the invention. The information interaction apparatus 50 is applied to a server, and includes a receiving unit 501, a determining unit 502 and a sending unit 503.

The receiving unit 501 is configured to receive a pre-performing message of a sensitive operation from a terminal in which a secondary account is located, where an identifier of the secondary account is carried in the pre-performing message of the sensitive operation.

The determining unit 502 is configured to determine an identifier of a primary account corresponding to the identifier of the secondary account based on the identifier of the secondary account received by the receiving unit 501 and pre-stored association relationships between identifiers of primary accounts and identifiers of secondary accounts.

The sending unit 503 is configured to send a verification request message of the sensitive operation to a terminal in which the primary account is located based on the identifier of the primary account determined by the determining unit 502.

The receiving unit 501 is further configured to receive verification result information from the terminal in which the primary account is located.

The sending unit 503 is further configured to send instruction information of the sensitive operation to the terminal in which the secondary account is located based on the verification result information received by the receiving unit 501, to instruct the terminal in which the secondary account is located to perform or cancel the sensitive operation.

In the embodiment of the invention, the receiving unit 501 receives the pre-performing message of the sensitive operation from the terminal in which the secondary account is located, where the identifier of the secondary account is carried in the pre-performing message of the sensitive operation and the identifier of the secondary account is used to identify the secondary account; the determining unit 502 determines the identifier of the primary account corresponding to the identifier of the secondary account based on the identifier of the secondary account received by the receiving unit 501 and the pre-stored association relationships between identifiers of primary accounts and identifiers of secondary accounts, where the identifier of the primary account is used to identify the primary account; the sending unit 503 sends the verification request message of the sensitive operation to the terminal in which the primary account with the identifier determined by the determining unit 502 is located; the receiving unit 501 further receives the verification result information from the terminal in which the primary account is located; and the sending unit 503 further sends the instruction information of the sensitive operation to the terminal in which the secondary account is located based on the verification result information received by the receiving unit 501, to instruct the terminal in which the secondary account is located to perform or cancel the sensitive operation. In contrast with conventional technology that sensitive operations are all required to be performed with a primary account, a sensitive operation can be performed with a secondary account under the supervision of the primary account through the apparatus according to the embodiment of the invention, so that some sensitive operations can be processed in a timely manner and security of operations can be improved.

Figure 6:
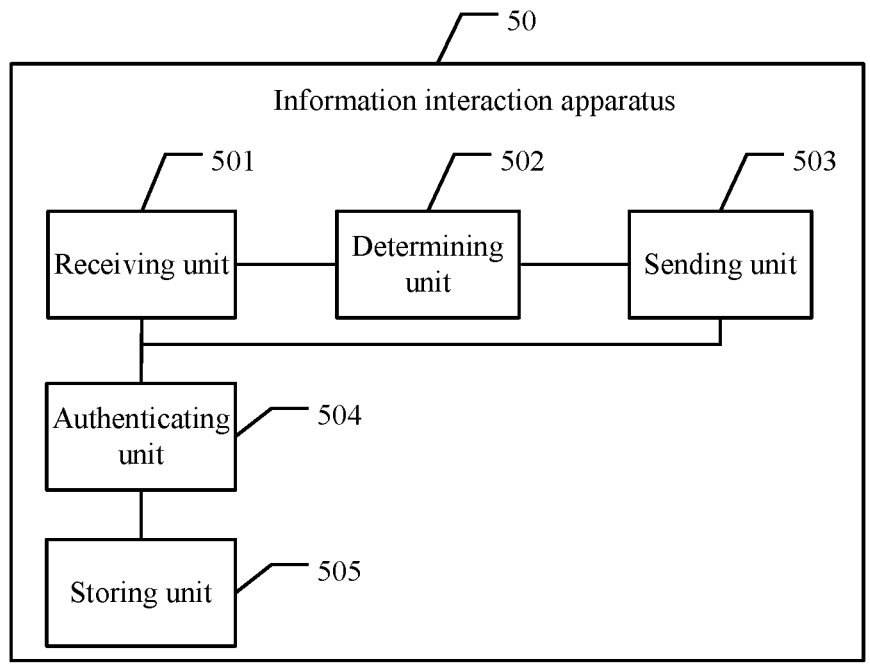
FIG. 6 is a schematic diagram of an information interaction apparatus according to an embodiment of the invention.

Reference is made to FIG. 6, which shows an information interaction apparatus according to an embodiment of the invention based on the embodiment corresponding to FIG. 5.

In the embodiment, the receiving unit 501 is further configured to receive an authentication application message from the terminal in which the primary account is located, where the identifier of the primary account is carried in the authentication application message.

The information interaction apparatus 50 further includes an authenticating unit 504 and a storing unit 505.

The authenticating unit 504 is configured to authenticate the identifier of the primary account.

The storing unit 505 is configured to establish and store a correspondence relationship between the identifier of the primary account and the terminal in which the primary account is located after the authenticating unit 504 authenticates the identifier of the primary account.

Figure 7:
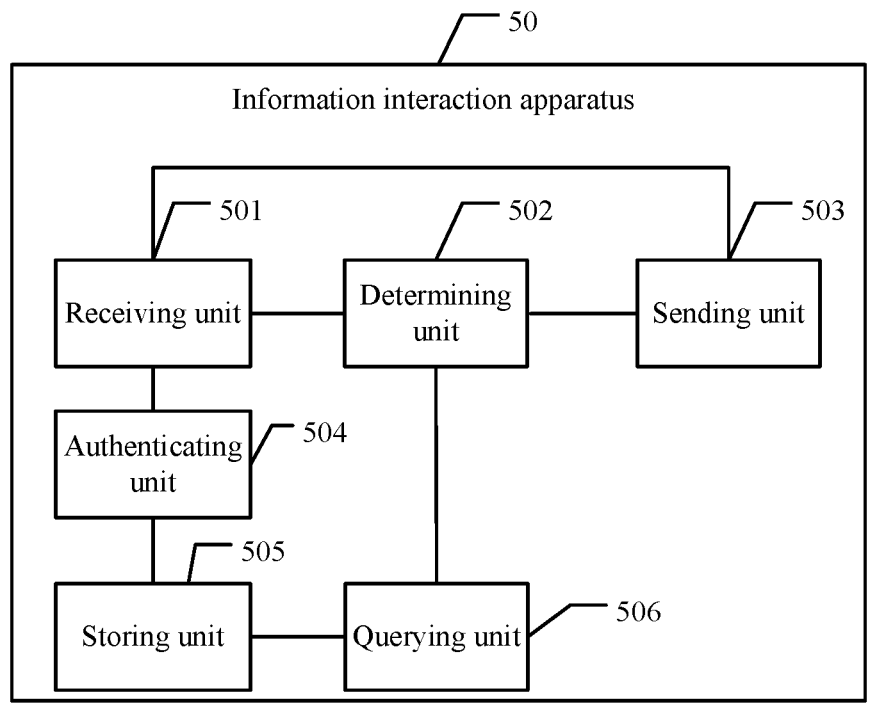
FIG. 7 is a schematic diagram of an information interaction apparatus according to an embodiment of the invention.

In an embodiment of the invention based on the embodiment corresponding to FIG. 6, as shown in FIG. 7, the information interaction apparatus 50 further includes:

a querying unit 506, configured to query for the terminal in which the primary account is located based on the identifier of the primary account determined by the determining unit 502 and the correspondence relationship between the identifier of the primary account and the terminal in which the primary account is located.

In an embodiment of the invention, the pre-performing message of the sensitive operation includes information on the sensitive operation to be performed with the secondary account, and the sending unit 503 is further configured to send the verification request message of the sensitive operation carrying the information on the sensitive operation to be performed with the secondary account to the terminal in which the primary account is located, where the terminal in which the primary account is located determines the verification result information based on the information on the sensitive operation to be performed with the secondary account.

The sensitive operation in the embodiment of the invention is an operation initiated with the secondary account and requiring confirmation with the primary account. For example, the sensitive operation may be an operation which may affect interests of a store owner, such as changing payment, refunding or transferring.

When a clerk performs the sensitive operation through the terminal in which the secondary account is located, the sensitive operation will not be performed immediately. Instead, the terminal in which the secondary account is located sends the pre-performing message of the sensitive operation to the server, where the pre-performing message of the sensitive operation may include information on the sensitive operation to be performed with the secondary account. Thereby, the sending unit 503 sends the verification request message of the sensitive operation carrying the information on the sensitive operation to be performed with the secondary account to the terminal in which the primary account is located. The terminal in which the primary account is located receives the information on the sensitive operation to be performed in the verification request message of the sensitive operation and displays the information on a display screen. For example, whether to agree to perform the sensitive operation can be displayed on the display screen of the terminal in which the primary account is located. A user can choose whether to agree to perform the sensitive operation, so that the verification result information can be generated based on a choice of the user.

Figure 8:
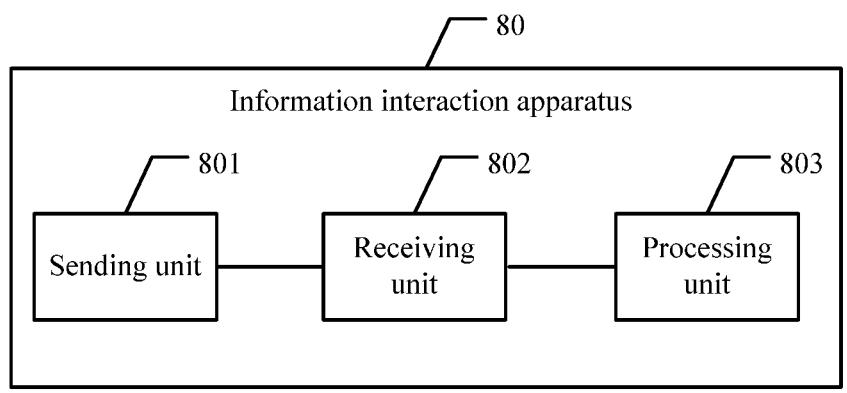
FIG. 8 is a schematic diagram of an information interaction apparatus according to an embodiment of the invention.

Reference is made to FIG. 8, which shows an information interaction apparatus 80 according to an embodiment of the invention. The information interaction apparatus may be applied to a terminal in which a secondary account is located, and includes a sending unit 801, a receiving unit 802 and a processing unit 803.

The sending unit 801 is configured to send a pre-performing message of a sensitive operation to a server, where an identifier of the secondary account is carried in the pre-performing message of the sensitive operation.

The receiving unit 802 is configured to receive instruction information of the sensitive operation from the server.

The processing unit 803 is configured to perform or cancel the sensitive operation according to the instruction information of the sensitive operation received by the receiving unit 802.

In the embodiment of the invention, the sending unit 801 sends the pre-performing message of the sensitive operation to the server, where the identifier of the secondary account is carried in the pre-performing message of the sensitive operation and the identifier of the secondary account is used to identify the secondary account; the receiving unit 802 receives the instruction information of the sensitive operation from the server; and the processing unit 803 performs or cancels the sensitive operation according to the instruction information of the sensitive operation received by the receiving unit 802. In contrast with conventional technology that sensitive operations are all required to be performed with a primary account, a sensitive operation can be performed with a secondary account under the supervision of the primary account through the apparatus according to the embodiment of the invention, so that some sensitive operations can be processed in a timely manner and security of operations can be improved.

Figure 9:
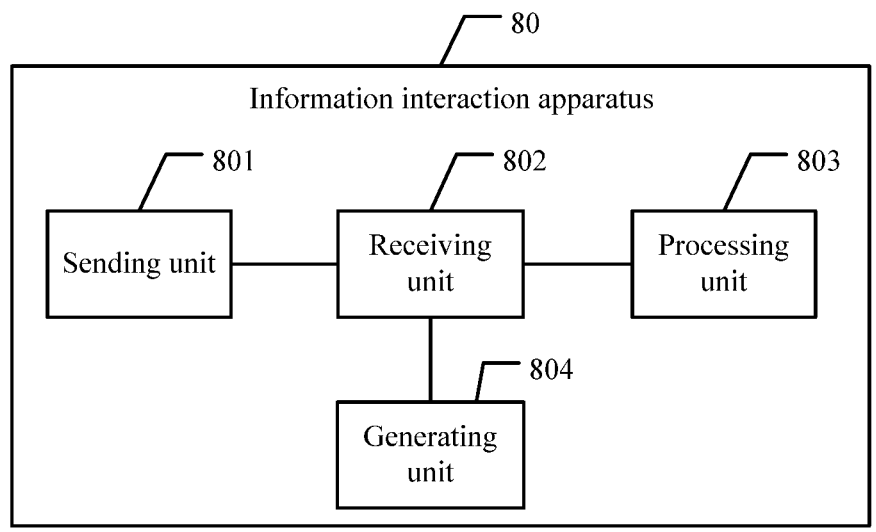
FIG. 9 is a schematic diagram of an information interaction apparatus according to an embodiment of the invention.

Reference is made to FIG. 9, which shows an information interaction apparatus according to an embodiment of the invention based on the embodiment corresponding to FIG. 8. In the embodiment, the receiving unit 802 is further configured to receive an instruction for the sensitive operation inputted by a user.

Besides, the information interaction apparatus 80 further includes:

a generating unit 804, configured to generate the pre-performing message of the sensitive operation based on the instruction for the sensitive operation received by the receiving unit 802.

Figure 10:
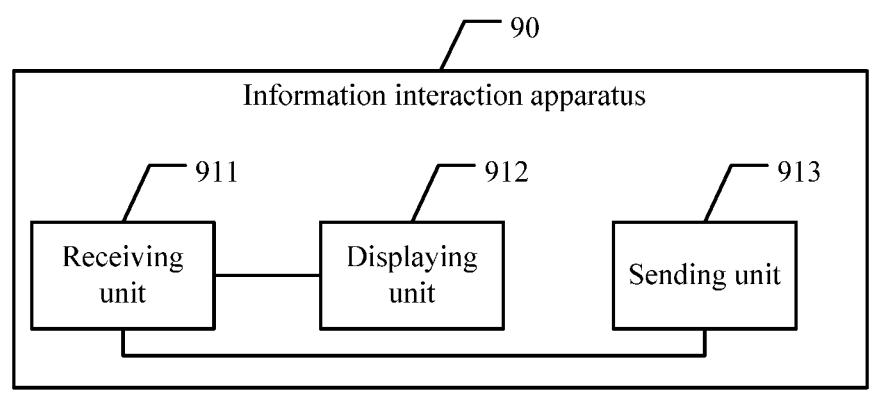
FIG. 10 is a schematic diagram of an information interaction apparatus according to an embodiment of the invention.

Reference is made to FIG. 10, which shows an information interaction apparatus 90 according to an embodiment of the invention. In the embodiment, the information interaction apparatus is applied to a terminal in which a primary account is located, and includes:

a receiving unit 911, configured to receive a verification request message of a sensitive operation from a server and further configured to receive a verification result instruction inputted by a user;

a displaying unit 912, configured to display the verification request message of the sensitive operation received by the receiving unit 911; and a sending unit 913, configured to send verification result information to the server based on the verification result instruction received by the receiving unit 911.

In the embodiment of the invention, the receiving unit 911 receives the verification request message of the sensitive operation from the server, the displaying unit 912 displays the verification request message of the sensitive operation received by the receiving unit 911, the receiving unit 911 is configured to receive the verification result instruction inputted by the user and the sending unit 913 sends the verification result information to the server based on the verification result instruction received by the receiving unit 911. In contrast with conventional technology that sensitive operations are all required to be performed with a primary account, a sensitive operation can be performed with a secondary account under the supervision of the primary account through the apparatus according to the embodiment of the invention, so that some sensitive operations can be processed in a timely manner and security of operations can be improved.

An information interaction apparatus 90 is provided according to an embodiment of the invention based on the embodiment corresponding to FIG. 10. In the information interaction apparatus 90 according to the embodiment, the sending unit 913 is further configured to send an authentication application message to the server, where an identifier of the primary account is carried in the authentication application message. Thereby, the server establishes and stores a correspondence relationship between the identifier of the primary account and the terminal in which the primary account is located after authenticating the terminal in which the primary account is located.

Figure 11:
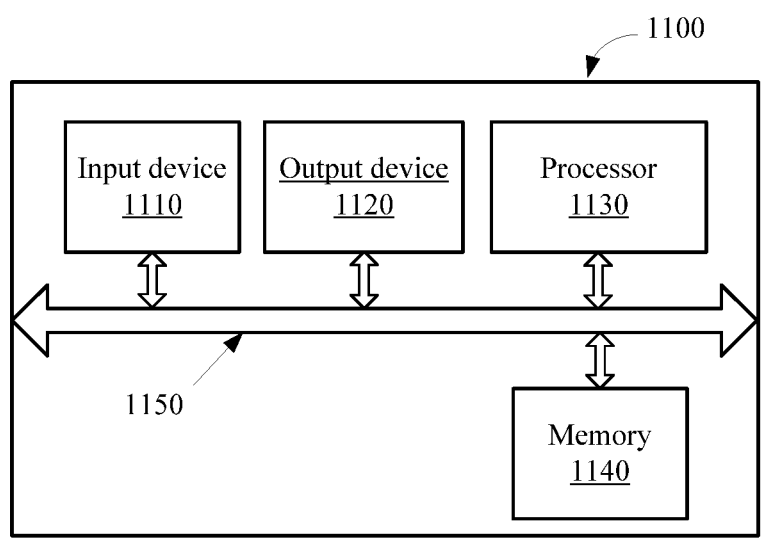
FIG. 11 is a schematic block diagram of a server according to an embodiment of the invention.

FIG. 11 is a structural diagram of a server 1100 according to an embodiment of the invention. The server 1100 may include an input device 1110, an output device 1120, a processor 1130 and a memory 1140.

The memory 1140 may include a read-only memory and a random access memory, and provides instructions and data for the processor 1130. Part of the memory 1140 may further include a non-volatile random access memory (NVRAM).

The memory 1140 may stored the following elements, executable modules or data structures, subsets thereof or supersets thereof:

operating instructions including various operating instructions for implementing various operations, and an operating system including various system programs for implementing basic services and processing hardware-based tasks.

In the embodiment of the invention, the processor 1130 performs the following operations by calling the operating instructions (the operating instructions may be stored in the operating system) stored in the memory 1140:

receiving, through the input device 1110, a pre-performing message of a sensitive operation from a terminal in which a secondary account is located, where an identifier of the secondary account is carried in the pre-performing message of the sensitive operation, determining an identifier of a primary account corresponding to the identifier of the secondary account based on the identifier of the secondary account and pre-stored association relationships between identifiers of primary accounts and identifiers of secondary accounts, sending a verification request message of the sensitive operation to a terminal in which the primary account is located based on the determined identifier of the primary account, receiving verification result information from the terminal in which the primary account is located, and sending, through the output device 1120, instruction information of the sensitive operation to the terminal in which the secondary account is located based on the verification result information, to instruct the terminal in which the secondary account is located to perform or cancel the sensitive operation.

In the embodiment of the invention, the identifier of the secondary account is used to identify the secondary account, and the identifier of the primary account is used to identify the primary account.

In the embodiment of the invention, when the terminal in which the secondary account is located performs the sensitive operation with assistance of the server 1100, a verification is conducted on the terminal in which the primary account is located, so that the sensitive operation required to be performed by the terminal in which the primary account is located can be performed by the terminal in which the secondary account is located, thereby achieving timely processing of some sensitive operations and ensuring security of operations.

The processor 1130 controls operations of the server 1100 and the processor 1130 may also be called CPU (central processing unit). The memory 1140 may include a read-only memory and a random access memory, and provides instructions and data for the processor 1130. Part of the memory 1140 may further include a non-volatile random access memory (NVRAM). In practical applications, components of the server 1100 are coupled together through a bus system 1150, where the bus system 1150 may include a power bus, a control bus and a status signal bus in addition to a data bus. For consideration of clear description, all buses in FIG. 11 are labeled as the bus system 1150

The method according to the embodiments of the present disclosure above may be applied to the processor 1130 or implemented by the processor 1130. The processor 1130 may be an integrated circuit chip with a signal processing capability. In implementations, steps of the method above may be performed through integrated logic circuits of hardware of the processor 1130 or software instructions. The processor 1130 above may be a general-purpose processor, a digital signal processor (DSP), an application-specific integrated circuit (ASIC), a field-programmable gate array (FPGA), any other programmable logic device, a discrete gate or transistor logic device or a discrete hardware component, which can implement or perform the method, steps and logic block diagrams according to the embodiments of the present disclosure. The general-purpose processor may be a micro processor or any conventional processor. The steps of the method according to the embodiments of the present disclosure may be performed by a hardware decoding processor, or a combination of hardware and software modules in a decoding processor. The software modules may be in a mature storage medium in the art, such as a random access memory, a flash memory, a read-only memory, an electrically erasable programmable read-only memory, or a register. The storage medium is in the memory 1140, and the processor 1130 reads information in the memory 1140 and implements the steps of the method above with hardware thereof.

Optionally, the input device 1110 may further receive an authentication application message from the terminal in which the primary account is located, where the identifier of the primary account is carried in the authentication application message.

The memory 1140 associatively stores the identifier of the primary account and an identifier of the terminal in which the primary account is located after an authentication application of the terminal in which the primary account is located is approved.

Optionally, the processor 1130 queries for the terminal in which the primary account is located based on the identifier of the primary account.

Figure 12:
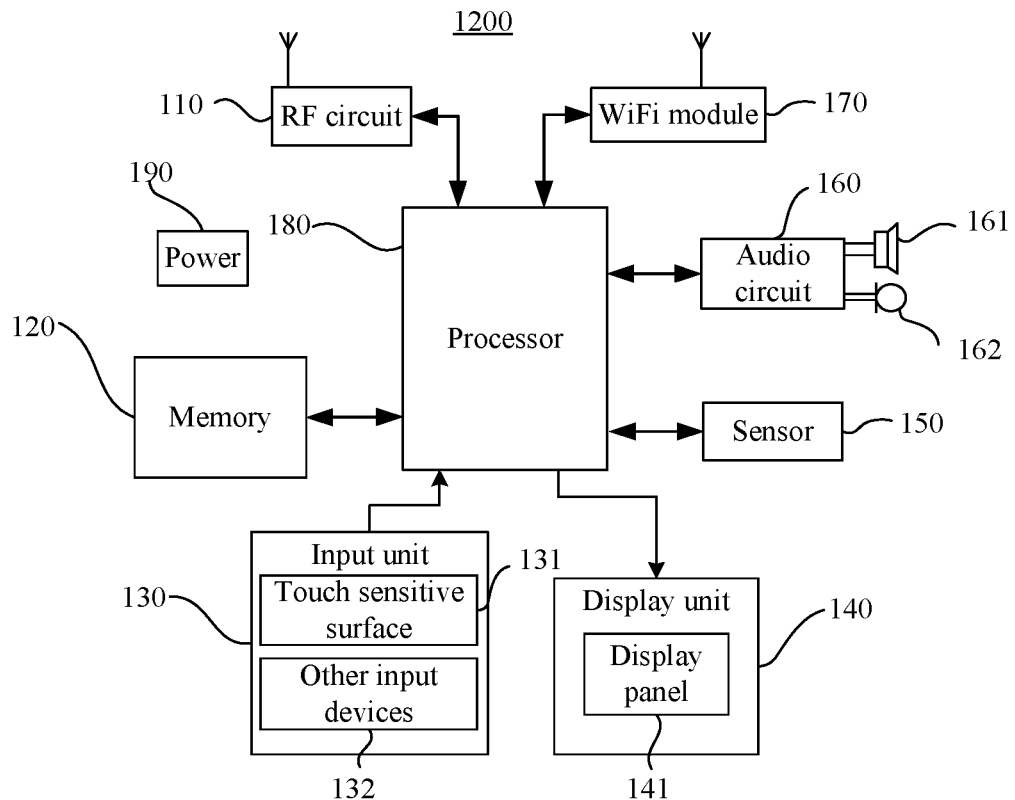
FIG. 12 is a schematic block diagram of a terminal according to an embodiment of the invention.

Reference is made to FIG. 12, which shows a structural diagram of a terminal according to an embodiment of the invention. The terminal can be configured to implement the information interaction method according to the embodiments above.

The terminal 1200 may include a RF (radio frequency) circuit 110, a memory 120 including one or more computer readable storage media, an input unit 130, a display unit 140, a sensor 150, an audio circuit 160, a WiFi (Wireless Fidelity) module 170, a processor 180 including one or more processing cores and a power supply 190. Those in the art shall understand the terminal structure shown in FIG. 12 is not constructed as a limit to the terminal, which may include more or less components than shown in FIG. 12, combinations of some of the components, or different components arrangements.

The RF circuit 110 can be configured to receive and send a signal in the process of receiving and sending information, particularly, receiving downlink information of a base station and transferring the downlink information to one or more processors 180 to process; and, in addition, send uplink-related data to the base station. Generally, the RF circuit 110 includes but is not limited to an antenna, at least one amplifier, a tuner, one or more oscillators, a user identity module (SIM) card, a transceiver, a coupler, a LNA (low noise amplifier) and a duplexer. Besides, the RF circuit 110 may communicate with other devices through wireless communications or a network. The wireless communications may adopt any communications standard or protocol, which includes but is not limited to GSM (Global System of Mobile communication), GPRS (General Packet Radio Service), CDMA (Code Division Multiple Access), WCDMA (Wideband Code Division Multiple Access), LTE (Long Term Evolution), e-mail and SMS (Short Messaging Service).

The memory 120 can be configured to store software programs and modules, and the processor 180 performs various functional applications and data processing by running the software programs and modules stored in the memory 120. The memory 120 may mainly include a program storage zone and a data storage zone, where operating systems, applications programs required by at least one function (such as an audio playing function and an image playing function) may be stored in the program storage zone and data (such as audio data and phone directories) created in the usage of the terminal 1200 may be stored in the data storage zone. Besides, the memory 120 may include a high-speed random access memory, and further include a nonvolatile memory, such as at least one magnetic disk memory, a flash memory or any other nonvolatile solid memory. Accordingly, the memory 120 may further include a memory controller, to provide an access to the memory 120 for the processor 180 and the input unit 130.

The input unit 130 can be configured to receive inputted figures or character information and generate a keyboard, mouse, operating leveler, optical or trackball signal input related to user settings and function control. Specifically, the input unit 130 may include a touch sensitive surface 131 and other input devices 132. The touch sensitive surface 131, also called a touch screen or a touch panel, can collect an operation thereon or nearby (for example, an operation of a user with any appropriate object or accessory such as a finger or a touch pen on or near the touch sensitive surface 131) and drive a corresponding connection device according to a preset procedure. Optionally, the touch sensitive surface 131 may include a touch detecting apparatus and a touch controller. The touch detecting apparatus detects a position of a touch operation by a user and a signal brought in by the touch operation, and sends the signal to the touch controller. The touch controller receives touch information from the touch detecting apparatus, converts the touch information into a coordinate of a touch point, sends the coordinate of the touch point to the processor 180, receives and executes commands from the processor 180. Besides, the touch sensitive surface 131 may be a resistive, capacitive, infrared or surface acoustic wave touch sensitive surface. In addition to the touch sensitive surface 131, the input unit 130 may further include other devices 132. The other devices 132 may include but are not limited to one or more of a physical keyboard, a functional button (such as a volume control button or a switch button), a trackball, a mouse and an operating lever.

The display unit 140 can be configured to display information inputted by the user or provided for the user, and various graphic user interfaces of the terminal 1200, where the graphic user interfaces may include images, texts, icons, videos and arbitrary combinations thereof. The display unit 140 may include a display panel 141, which, optionally, may be configured in the form of LCD (liquid crystal display) or OLED (organic light-emitting diode). Further, the display panel 141 may be covered by the touch sensitive surface 131. After detecting a touch operation thereon or nearby, the touch sensitive surface 131 sends the touch operation to the processor 180 to determine a type of the touch event, and then the processor 180 provides a corresponding visual output on the display panel 141 according to the type of the touch event. Although in FIG. 12 the touch sensitive surface 131 and the display panel 141 implement an input and output function as two independent components, the touch sensitive surface 131 and the display panel 141 may be integrated together to implement the input and output function in some embodiments.

The terminal 1200 may further include at least one sensor 150, such as a light sensor, a motion sensor and any other sensor. Specifically, the light sensor may include an environmental light sensor and a proximity sensor. The environmental light sensor can adjust a lightness of the display panel 141 according to a brightness of environmental light, and the proximity sensor can turn off at least one of the display panel and a backlight of the display panel 141 when the terminal 1200 is moved close to an ear. As one kind of the motion sensor, an accelerometer sensor can detect values of accelerations in various directions (generally in three axes), and detect a value and a direction of gravity when being motionless, which can be applied to applications of recognizing a gesture of a cellphone (such as switching between landscape mode and portrait mode, related games and magnetometer calibration) and related functions of vibration recognition (such as a pedometer and a knock). Other sensors which may be included in the terminal 1200, such as a gyroscope, a barometer, a hygrometer, a thermometer and an infrared sensor are not described herein redundantly.

The audio circuit 160, a loudspeaker 161 and a microphone 162 can provide an audio interface between a user and the terminal 1200. The audio circuit 160 can transmit an electrical signal converted from received audio data to the loudspeaker 161, and the loudspeaker 161 then converts the electrical signal into an acoustical signal and outputs the acoustical signal. On the other hand, the microphone 162 converts a collected acoustical signal into an electrical signal; the audio circuit 160 receives the electrical signal, converts the electrical signal into audio data and sends the audio data to the processor 180; and after processing the audio data, the processor 180 sends the audio data as processed to another terminal through the RF circuit 110, for example, or outputs the audio data to the memory 120 for further processing. The audio circuit 160 may further include a headset jack, to provided communications between an external headset and the terminal 1200.

WiFi is a short distance wireless transmission technology. The terminal 1200 can help the user receive and send e-mails, browse webpages and access streaming media with the WiFi module 170, which provides an access to wireless broadband internet for the user. Although a WiFi module 170 is shown in FIG. 12, it is understood that the WiFi module 170 is not a necessary part of the terminal 1200 and can be absolutely omitted without deviating from the essence of the invention.

The processor 180 is the control center of the terminal 1200, which connects all parts of the cellphone through interfaces and circuits, implements the functions of the terminal 1200 and processes data by running or executing the software programs or modules stored in the memory 120 and calling data stored in the memory 120, thereby realizing an overall monitoring on the cellphone. Optionally, the processor 180 may include one or more processing cores. Preferably, the processor 180 may be integrated with an application processor and a modulation/demodulation processor, where the application processor is mainly configured to process the operating systems, user interfaces and applications and the modulation/demodulation processor is mainly configured to process wireless communications. It is understood the modulation/demodulation processor may not be integrated into the processor 180.

The terminal 1200 further includes the power supply 190 (for example, a battery) to supply the components with power. Preferably, the power supply may be logically connected to the processor 180 through a power management system, thereby implementing functions of managing charging, discharging and power consumption with the power management system. The power supply 190 may further include any components such as one or more direct current or alternative current power supplies, a recharging system, a power failure detection circuit, a power converter or inverter and a power status indicator.

Although not shown, the terminal 1200 may further include a camera and a Bluetooth module, which is not described redundantly herein. In the embodiment, the display unit of the terminal is a touch-screen display. The terminal also includes a memory and one or more programs, where the one or more programs are stored in the memory and configured to be executed by one or more processors to execute instructions included in the one or more programs for performing the following operations:

sending a pre-performing message of a sensitive operation to a server, where an identifier of a secondary account is carried in the pre-performing message of the sensitive operation and the identifier of the secondary account is used to identify the secondary account;

receiving instruction information of the sensitive operation from the server, where the instruction information of the sensitive operation is used to instruct a terminal in which the secondary account is located to perform or cancel the sensitive operation; and performing or canceling the sensitive operation according to the instruction information of the sensitive operation.

The sensitive operation is an operation initiated with the secondary account and requiring confirmation with the primary account.

Supposing the above is a first possible implementation, in a second possible implementation based on the first possible implementation, the memory of the terminal further includes instructions for performing the following operations:

receiving an instruction for the sensitive operation inputted by a user; and generating the pre-performing message of the sensitive operation based on the instruction for the sensitive operation.

According to the descriptions above, in the embodiment of the invention, the terminal in which the secondary account is located sends the pre-performing message of the sensitive operation to the server, where the identifier of the secondary account is carried in the pre-performing message of the sensitive operation and the sensitive operation is an operation requiring confirmation with the primary account, receives the instruction information of the sensitive operation from the server, where the instruction information of the sensitive operation is used to instruct the terminal in which the secondary account is located to perform or cancel the sensitive operation, and performs or cancels the sensitive operation according to the instruction information of the sensitive operation. The terminal according to the embodiment of the invention can perform a sensitive operation under the supervision of the primary account, so that some sensitive operations can be processed in a timely manner and security of operations can be improved.

In an aspect, a computer readable storage medium is further provided according to an embodiment of the invention. The computer storage medium may be the computer readable storage medium included in the memory according to the embodiment above, or an independent computer readable storage medium which is not installed to any terminal. The computer readable storage medium stores one or more programs, where the one or more programs are executed by one or more processors to implement an information interaction method which includes:

sending a pre-performing message of the sensitive operation to a serve, where an identifier of a secondary account is carried in the pre-performing message of the sensitive operation;

receiving instruction information of the sensitive operation from the server, where the instruction information of the sensitive operation is used to instruct a terminal in which the secondary account is located to perform or cancel the sensitive operation; and performing or canceling the sensitive operation according to the instruction information of the sensitive operation.

In the embodiment of the invention, the identifier of the secondary account is used to identify the secondary account, and the sensitive operation is an operation initiated with the secondary account and requiring confirmation with the primary account.

Supposing the above is a first possible implementation, in a second possible implementation based on the first possible implementation, before the terminal in which the secondary account is located sends the pre-performing message of the sensitive operation to the server, the information interaction method further includes:

receiving an instruction for the sensitive operation inputted by a user; and generating the pre-performing message of the sensitive operation based on the instruction for the sensitive operation.

The process above is performed by the terminal in which the secondary account is located, and a process performed by a terminal in which the primary account is located according to an embodiment of the invention includes the following:

receiving and displaying, by the terminal in which the primary account is located, a verification request message of the sensitive operation from the server;

receiving a verification result instruction inputted by the user; and sending verification result information to the server based on the verification result instruction.

Supposing the above is a first possible implementation, in a second possible implementation based on the first possible implementation, before the receiving and displaying a verification request message of the sensitive operation from the server, the information interaction method further includes:

sending an authentication application message to the server, where an identifier of the primary account is carried in the authentication application message, so that the server can associatively store the identifier of the primary account and an identifier of the terminal in which the primary is located after the terminal in which the primary account is located is authenticated.

Figure 13:
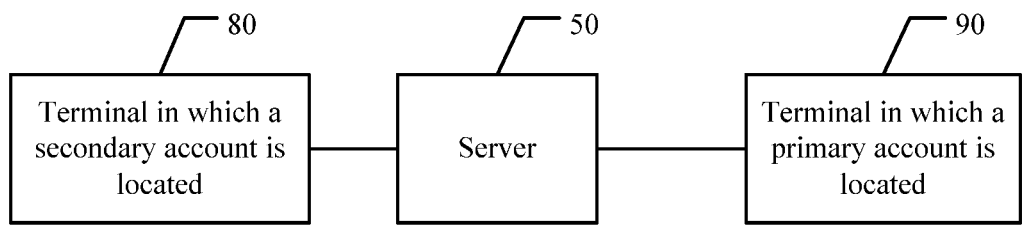
FIG. 13 is a schematic block diagram of an information interaction system according to an embodiment of the invention.

Reference is made to FIG. 13, which shows an information interaction system according to an embodiment of the invention, which includes a terminal 80 in which a secondary account is located, a terminal 90 in which a primary account is located and a server 50.

The terminal 80 in which the secondary account is located sends a pre-performing message of a sensitive operation to the server 50, where an identifier of the secondary account is carried in the pre-performing message of the sensitive operation.

The server 50 determines an identifier of the primary account corresponding to the identifier of the secondary account based on the identifier of the secondary account and pre-stored association relationships between identifiers of primary accounts and identifiers of secondary accounts, and sends a verification request message of the sensitive operation to the terminal in which the primary account is located based on the determined identifier of the primary account.

The terminal 90 in which the primary account is located receives the verification request message of the sensitive operation from the server, generates verification result information based on the verification request message and sends the verification result information to the server.

The server 50 sends instruction information of the sensitive operation to the terminal in which the secondary account is located based on the verification result information from the terminal in which the primary account is located.

The terminal 80 in which the secondary account is located performs or cancels the sensitive operation according to the instruction information of the sensitive operation.

Those in the art shall understand that all or some of the steps of the method according to the embodiments above may be performed through hardware under the instruction of a program, where the program may be stored in a computer readable storage medium, such as a ROM, a RAM, a magnetic disk or an optical disc.

The information interaction method, the apparatus and the system according to the present disclosure are described in detail. The principle and implementation of the invention are described through some specific embodiments in the present disclosure, and the descriptions of the embodiments above are only for understanding the method of the invention and the core idea thereof. And, modifications may be made by those in the art within the spirit of the invention on specific implementation and application scope thereof. According to the above, the specification should not be interpreted as a limit the invention.

We claim:

1. An information interaction method comprising:

receiving, by a server storing a table comprising a relationship between an identifier of a primary account and an identifier of a secondary account, a pre-performing message from a secondary terminal in which the secondary account is located, wherein the pre-performing message comprises a sensitive operation and the identifier of the secondary account;

in response to receiving the pre-performing message from the secondary terminal, determining, by the server, the identifier of the primary account based on the identifier of the secondary account by looking up the table comprising the relationship between the identifier of the primary account and the identifier of the secondary account;

sending, by the server, a verification request message to a primary terminal in which the primary account is located based on the determined identifier of the primary account;

receiving, by the server, verification result information from the primary terminal;

sending, by the server, instruction information of the sensitive operation to the secondary terminal based on the verification result information, to instruct the secondary terminal to perform or cancel the sensitive operation;

wherein before sending the verification request message to the primary terminal, the method further comprises:

receiving, by the server, an authentication application message from the primary terminal, wherein the authentication application message comprises the identifier of the primary account and an identifier of the primary terminal, authenticating, by the server, the identifier of the primary account, and in response to authenticating the identifier of the primary account, establishing and storing, by the server, a correspondence relationship between the identifier of the primary account and the identifier of the primary terminal; and wherein the authenticating the identifier of the primary account comprises:

sending, by the server, a short message to the primary terminal, the short message comprising a verification code or a password, receiving, by the server, the verification code or the password from the primary terminal, and approving, by the server, the authentication application message from the primary terminal.

2. The method according to claim 1, wherein after determining the identifier of the primary account based on the identifier of the secondary account, the method further comprises:

querying for the primary terminal based on the identifier of the primary account and the stored correspondence relationship between the identifier of the primary account and the identifier of the primary terminal.

3. The method according to claim 1, wherein:

the pre-performing message comprises information on the sensitive operation to be performed with the secondary account; and sending the verification request message to the primary terminal comprises:

sending the verification request message comprising the information on the sensitive operation to be performed with the secondary account to the primary terminal, and wherein the primary terminal determines the verification result information based on the information on the sensitive operation to be performed with the secondary account.

4. The method according to claim 1, wherein the sensitive operation is an operation initiated with the secondary account and requiring confirmation with the primary account.

5. An information interaction apparatus, comprising:

at least one processor; and a memory storing a table comprising a relationship between an identifier of a primary account and an identifier of a secondary account and program instructions, wherein, when the program instructions are executed by the at least one processor, the at least one processor is configured to cause the apparatus to:

receive a pre-performing message from a secondary terminal, wherein the pre-performing message comprises a sensitive operation and the identifier of the secondary account, in response to receiving the pre-performing message from the secondary terminal, determine the identifier of the primary account based on the identifier of the secondary account by looking up the table comprising the relationship between the identifier of the primary account and the identifier of the secondary account, send a verification request message to a primary terminal in which the primary account is located based on the identifier of the primary account, receive verification result information from the primary terminal, and send instruction information of the sensitive operation to the secondary terminal based on the verification result information, to instruct the secondary terminal to perform or cancel the sensitive operation;

wherein before the at least one processor is configured to cause the apparatus to send the verification request message to the primary terminal, the at least one processor is configured to further cause the apparatus to:

receive an authentication application message from the primary terminal, wherein the authentication application message comprises the identifier of the primary account and an identifier of the primary terminal, authenticate the identifier of the primary account, and in response to authenticating the identifier of the primary account, establish and store a correspondence relationship between the identifier of the primary account and the identifier of the primary terminal; and wherein when the at least one processor is configured to cause the apparatus to authenticate the identifier of the primary account, the at least one processor is configured to cause the apparatus to:

send a short message to the primary terminal, the short message comprising a verification code or a password, receive the verification code or the password from the primary terminal, and approve the authentication application message from the primary terminal.

6. The apparatus according to claim 5, wherein, when the program instructions are executed by the at least one processor, the at least one processor is further configured to cause the apparatus to:

query for the primary terminal based on the identifier of the primary account and the stored correspondence relationship between the identifier of the primary account and the identifier of the primary terminal.

7. The apparatus according to claim 5, wherein:

the pre-performing message comprises information on the sensitive operation to be performed with the secondary account, and when the program instructions are executed by the at least one processor, the at least one processor is configured further cause the apparatus to:

send the verification request message comprising the information on the sensitive operation to be performed with the secondary account to the primary terminal, and wherein the primary terminal determines the verification result information based on the information on the sensitive operation to be performed with the secondary account.

8. The apparatus according to claim 5, wherein the sensitive operation is an operation initiated with the secondary account and requiring confirmation with the primary account.

9. An information interaction system, comprising:

a secondary terminal, in which a secondary account is located, comprising at least one processor and a memory;

a primary terminal, in which a primary account is located, comprising at least one processor and a memory; and a server storing a table comprising a relationship between an identifier of the primary account and an identifier of the secondary account, wherein:

the secondary terminal is configured to send a pre-performing message to the server, wherein the pre-performing message comprises a sensitive operation and the identifier of the secondary account, the server is configured to determine the identifier of the primary account based on the identifier of the secondary account by looking up the table comprising the relationship between the identifier of the primary account and the identifier of the secondary account, in response to receiving the pre-performing message from the secondary terminal, and send a verification request message to the primary terminal based on the determined identifier of the primary account, the primary terminal is configured to receive the verification request message from the server, generate verification result information based on the verification request message, and send the verification result information to the server, the server is further configured to send instruction information of the sensitive operation to the secondary terminal based on the verification result information from the primary terminal, and the secondary terminal is further configured to perform or cancel the sensitive operation according to the instruction information; and wherein before the server sends the verification request message to the primary terminal:

the server receives an authentication application message from the primary terminal, wherein the authentication application message comprises the identifier of the primary account and an identifier of the primary terminal, the server authenticates the identifier of the primary account, and in response to authenticating the identifier of the primary account, the server establishes and stores a correspondence relationship between the identifier of the primary account and the identifier of the primary terminal; and wherein when the server authenticate the identifier of the primary account:

send a short message to the primary terminal, the short message comprising a verification code or a password, receive the verification code or the password from the primary terminal, and approve the authentication application message from the primary terminal.

10. The system according to claim 9, wherein the server is further configured to query for the primary terminal based on the identifier of the primary account and the stored correspondence relationship between the identifier of the primary account and the identifier of the primary terminal.

11. The system according to claim 9, wherein:

the pre-performing message comprises information on the sensitive operation to be performed with the secondary account, the server is further configured to send the verification request message comprising the information on the sensitive operation to be performed with the secondary account to the primary terminal, and the primary terminal is further configured to determine the verification result information based on the information on the sensitive operation to be performed with the secondary account.

12. The system according to claim 9, wherein the sensitive operation is an operation initiated with the secondary account and requiring confirmation with the primary account.

13. The method according to claim 1, wherein the verification result information from the primary terminal is based on user input at the primary terminal.

14. The method according to claim 1, wherein the primary terminal is a cell phone.

15. The apparatus according to claim 5, wherein the verification result information from the primary terminal is based on user input at the primary terminal.

16. The apparatus according to claim 5, wherein the primary terminal is a cell phone.

17. The system according to claim 9, wherein the verification result information from the primary terminal is based on user input at the primary terminal, and the primary is a cell phone.

* * * * *